(12) United States Patent
Kirjavainen et al.

(10) Patent No.: US 6,187,237 B1
(45) Date of Patent: Feb. 13, 2001

(54) METHOD FOR MAKING A PRODUCT TO BE EXTRUDED, AND AN EXTRUDER

(75) Inventors: Kari Kirjavainen, Espoo; Jyri Järvenkylä, Hollola, both of (FI)

(73) Assignee: Nextrom Holding S.A., Ecublens (CH)

( * ) Notice: Under 35 U.S.C. 154(b), the term of this patent shall be extended for 0 days.

(21) Appl. No.: 09/142,515

(22) PCT Filed: Apr. 4, 1997

(86) PCT No.: PCT/FI97/00211

§ 371 Date: Sep. 9, 1998

§ 102(e) Date: Sep. 9, 1998

(87) PCT Pub. No.: WO97/37832

PCT Pub. Date: Oct. 16, 1997

(30) Foreign Application Priority Data

Apr. 4, 1996 (FI) .................................................. 961540

(51) Int. Cl.$^7$ .................................................. B29C 47/78
(52) U.S. Cl. .................................... 264/173.16; 264/40.6; 264/40.7; 264/171.29; 264/209.2; 264/209.8; 264/349; 425/131.1; 425/133.1; 425/378.1; 425/380; 425/204; 425/209; 366/83; 366/152.1; 366/160.1
(58) Field of Search .................. 264/173.16, 40.6, 264/40.7, 171.29, 171.26, 211.21, 209.2, 209.8, 349; 425/131.1, 133.1, 378.1, 380, 204.209; 366/83, 152.1, 160.1, 160.2

(56) References Cited

U.S. PATENT DOCUMENTS

| 3,314,108 | 4/1967 | Wienand et al. |
|---|---|---|
| 3,865,913 * | 2/1975 | Lachner et al ........................ 264/40 |
| 3,921,963 * | 11/1975 | Neff et al. ............................. 259/191 |
| 3,966,861 * | 6/1976 | Papesh et al. ......................... 264/95 |
| 4,420,451 * | 12/1983 | Rasmussen ............................ 264/173 |
| 4,521,368 * | 6/1985 | Mercer et al. ........................ 264/514 |
| 4,820,464 * | 4/1989 | Sasaki et al. ......................... 264/40.1 |
| 5,358,327 * | 10/1994 | Derezinski et al. ................... 366/79 |
| 5,387,386 * | 2/1995 | Kirjavainen .......................... 264/173 |

FOREIGN PATENT DOCUMENTS

| 392045 | 9/1965 | (CH) . |
|---|---|---|
| 372214 | 3/1923 | (DE) . |
| 1454762 | 5/1969 | (DE) . |
| 0153715 | 9/1985 | (EP) . |
| 0422042 | 1/1995 | (EP) . |
| 8911961 | 12/1989 | (WO) . |

* cited by examiner

Primary Examiner—Jan H. Silbaugh
Assistant Examiner—Mark Eashoo
(74) Attorney, Agent, or Firm—Ladas & Parry

(57) ABSTRACT

A method for making a product to be extruded and an extruder. The extruder has at least two conical stators and at least one conical rotor placed rotatably between the stators. The extruder further has supply conduits for feeding the material to be extruded separately into the exterior and interior of the rotor. Each supply conduit is provided with a separately adjustable feeding device by means of which the amount of material flow to be supplied can be adjusted. The degree to which the space between the rotor and the stator is filled and the amount of the heat generated by friction can be regulated. Further, the ratio of the material flows in the different supply conduits determines the ratio of the thickness of the layers obtained. The method and extruder according to the invention make it possible to regulate the properties of a final product easily and in several different ways.

17 Claims, 2 Drawing Sheets

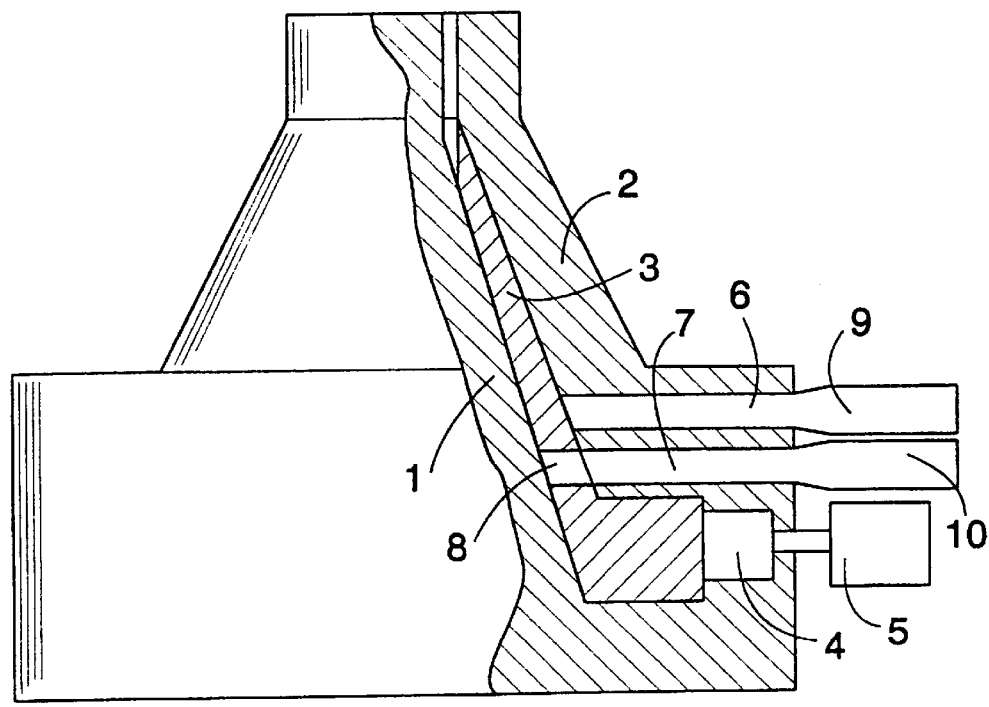
FIG. 1
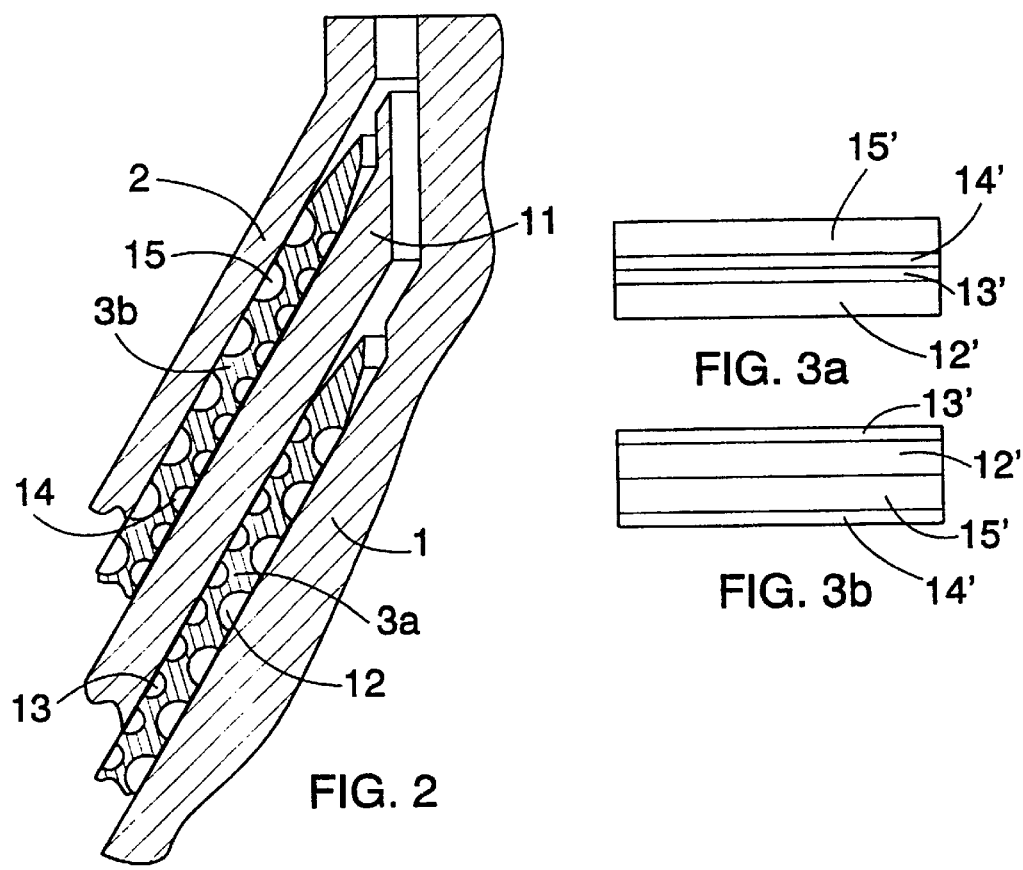
FIG. 2
FIG. 3a
FIG. 3b

METHOD FOR MAKING A PRODUCT TO BE EXTRUDED, AND AN EXTRUDER

FIELD OF THE INVENTION

The invention relates to a method for making a product to be extruded, in which method material to be extruded is fed into an extruder comprising at least two conical feed gaps placed one within the other in the radial direction and positioned between a rotatable rotor and a stator, whereupon the material to be extruded is supplied separately to each feed gap.

The invention further relates to an extruder comprising at least two conical feed gaps placed one within the other in the radial direction and positioned between a rotatable rotor and a stator, at least two supply conduits for feeding the material to be extruded separately into each feed gap, and feeding devices for feeding material along the supply conduits.

BACKGROUND OF THE INVENTION

U.S. Pat. No. 3,314,108 discloses an extruder comprising two conical stators and a rotor placed rotatably between the stators. This apparatus comprises supply conduits along which a material to be extruded can be supplied in such a way that the material is fed along one supply conduit into the exterior of the rotor and along the other supply conduit into the interior of the rotor via openings provided therein. The apparatus enables the manufacture of, for example, two-layer plastic pipes, but the layer thicknesses of the pipe or the temperature of the material to be extruded cannot be regulated or changed in any way.

EP 0 422 042 discloses an extruder comprising at least three conical stators and at least two conical rotors placed between the stators. The material to be extruded is fed between the rotor and the stator via supply conduits. The rotors also comprise openings via which the material to be supplied can also enter the rotor and flow to the space between the rotor and the stator provided inside it. The apparatus provides for example multilayer pipes, but it is not possible to regulate the properties of the different layers with respect to each other. Also, the temperature of the materials on different sides of the rotor is the same on each side and there is no possibility of cooling from the outside. Further, regulation of the temperature of the material to be extruded in the extruder must be carried out with difficult separate heating arrangements.

DE 1 454 762 discloses an extruder comprising two feeding devices with an adjustable feed rate. The feeding devices supply the different components of the mass to be extruded to the space around the screw in such a way that the mass components are mixed at the beginning of the screw, whereupon the extruder produces a mass that is a mixture of different components. The screw is used to extrude a one-layer product, whereupon the mixing ratio of the mass components supplied from the different feeding devices is regulated by adjusting the feeding devices. Therefore the apparatus can only provide a mixed one-layer product.

CH 392 045 discloses an apparatus comprising a feeding device which can be used to adjust the amount of the mass flow to be supplied. Also in this case, the mass flow is supplied to the space surrounding the screw, by means of which a one-layer product is extruded, i.e. the apparatus cannot produce products where the properties of the different layers are adjusted separately.

EP 0 153 715 discloses an extruder where material to be extruded is supplied from two hoppers to the outer surface of a tubular rotor. The tubular rotor is provided with grooves such that the materials arriving from different hoppers are first passed to different directions at the outer surface of the rotor and thereafter via the ends of the rotor to the interior thereof. The apparatus is further provided with force-feed rings by means of which the speed of travel of the material at the surface of the rotor can be regulated. The regulation requires a complicated and cumbersome construction in order to be successful, since the force-feed rings require two large rotating drive motors that must rotate against the direction of rotation of the rotor. Further, the feed rings themselves grind the material. The supply arrangement does not in any way ensure the flow of a sufficient amount of the material forward, either, but for example if the supply conduit becomes clogged, it is not possible to supply a sufficient amount of material forward by means of the feed rings even with high speeds of rotation. Further, in the apparatus the regulation of the temperature of the material must be carried out, if desired, with difficult external heating or cooling devices.

SUMMARY OF THE INVENTION

The purpose of the present invention is to provide a method and an apparatus with which the properties of the different layers of the product to be extruded can be adjusted in a simple and easy manner.

The method according to the invention is characterized in that each of the material flows to be supplied is adjusted separately and the speed of rotation of the rotor is adjusted, whereupon the temperature of the material to be extruded is adjusted by regulating the amount of the material flows and the speed of rotation of the rotor.

Further, the extruder according to the invention is characterized in that each supply conduit is provided with a separately adjustable feeding device for regulating the material flow to be supplied via the supply conduit, and that the extruder comprises means for adjusting the speed of rotation of the rotor, whereupon the temperature of the material can be adjusted by regulating the amount of the material flows and the speed of rotation of the rotor.

The essential idea of the invention is that the extruder comprises at least two feeding devices, whereupon the material to be extruded can be supplied along different supply conduits separately to each conical feed gap. The amount of the material flow to be supplied can be adjusted with the feeding devices, and it is thus possible to influence the degree to which the space between the rotor and the stator is filled and therefore the amount of heat generated by friction and the thickness of the layers obtained. The adjustment of these parameters naturally affects the properties of the final product. Further, the idea of an embodiment is that the speed of rotation of the rotor can be adjusted, whereupon it is possible to regulate the amount of heat that results from friction and that affects the material. The idea of another preferred embodiment is that the extruder comprises at least two rotors, and that both sides of the rotors are provided with screw-shaped grooves for supplying material to the nozzle of the extruder, and at least one set of the screw-shaped grooves of at least one rotor have a different cross-section than the grooves of the other rotors, and that the positioning of the rotors with respect to each other can be changed. In such a case, depending on the positions of the rotors with respect to each other, it is possible to prepare a product having properties that depend on the order of the rotors.

The invention has the advantage that with the method and apparatus according to the invention, the properties of the final product can be adjusted easily and in various ways.

BRIEF DESCRIPTION OF THE DRAWINGS

The invention will be described in greater detail in the accompanying drawings, in which FIG. 1 is a schematic side view, in partial cross-section, of an extruder according to the invention, FIG. 2 shows, in cross-section, a detail of another extruder according to the invention, FIGS. 3a and 3b schematically show a part of a cross-section of a wall in a product prepared with the apparatus according to the invention.

DETAILED DESCRIPTION

Figure 4:
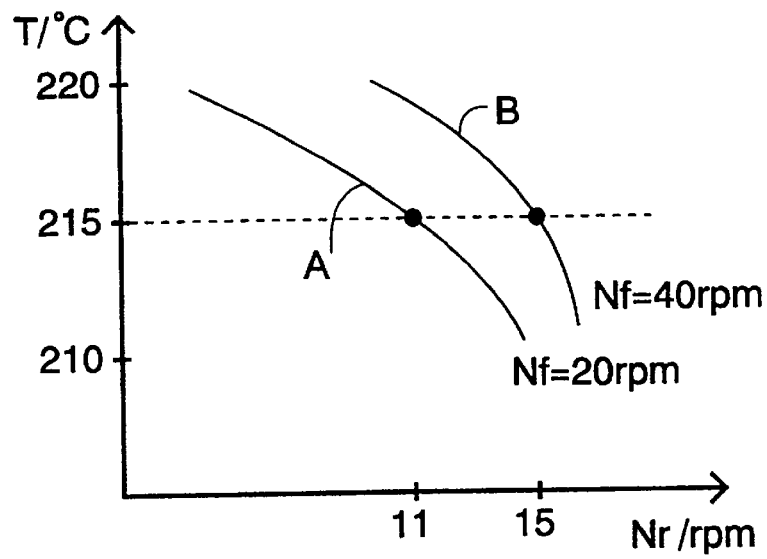
FIG. 4 shows the temperature of the mass as a function of the speed of rotation of the rotor.

FIG. 1 is a side view, in partial cross-section, of an extruder according to the invention. The extruder comprises an inner stator 1 and an outer stator 2 placed outside the inner stator. At least the outer surface of the inner stator 1 and the inner surface of the outer stator 2 are conical. Between the inner stator 1 and the outer stator 2 there is positioned a conical rotor 3 in such a way that between the rotor 3 and the inner stator 1 and the rotor 3 and the outer stator 2 there are conical feed gaps that are placed one within the other in the radial direction. The rotor 3 is adapted to move rotatably between the inner stator 1 and the outer stator 2. The rotor 3 is rotated by a motor 5. The motor 5 may be for example a hydraulic motor, an electric motor or some other motor that is known per se and that is suitable for the purpose. The motor 5 is adapted to rotate the rotor 3 through a gear system 4. The speed of rotation of the rotor 3 can be adjusted in a desired manner by means of the gear system 4. On the other hand, for example when an electric motor is used, the gear system 4 is not necessary, since the rotational frequency of the rotor 3 can be adjusted easily by regulating the rotational speed of the motor 5 in a manner known per se. The above-described components of the extruder are known per se, wherefore they have not been discussed in greater detail in this connection.

The extruder further comprises a first supply conduit 6 along which the material to be extruded can be fed into the exterior of the rotor 3 between the rotor 3 and the outer stator 2. The extruder also comprises a second supply conduit 7 along which material can be fed into the interior of the rotor 3 between the rotor 3 and the inner stator 1 via an opening or openings 8 provided in the rotor 3. The material to be fed into the first supply conduit 6 is supplied with a first feeding device 9. Correspondingly, for the purpose of feeding materials into the second supply conduit 7, the arrangement comprises a second feeding device 10. The feeding devices 9 and 10 can be for example feed screws, pumps or some other devices known per se. The essential feature is that with this feeding device, the flow rate of the material to be fed into the supply conduit can be adjusted.

By adjusting the flow rate of the material to be supplied by the feeding device 9, it is possible to affect the filling of the parts between the rotor 3 and the stators 1 and 2. The more material the part contains, the smaller the amount of heat generated by the friction. When less material is fed into the feed gap, the residence time of the mass in the rotor becomes longer and the amount of heat generated by the friction therefore increases. Further, the ratio of the flow amounts to be supplied determines the ratio of the layer thicknesses in the final product obtained. Also, adjusting the speed of rotation of the rotor 3 makes it possible to regulate the amount of heat generated by the friction, i.e. the faster the rotor 3 rotates, the more heat is generated due to the friction. Therefore, by adjusting the flow amounts of the material to be supplied with the first feeding device 9 and the second feeding device 10 and by regulating the speed of rotation of the rotor 3, it is easy to adjust the temperature of the material and the properties of the final product.

With the feeding devices 9 and 10 it is also possible to supply material from the end of the extruder viewed from below in FIG. 1. Further, the supply conduits 6 and 7 can be placed in such a way that the place where material is supplied is placed tangentially on the circumference of the rotor. Thus, it is easier to force material into the extruder with the feeding devices 9 and 10. The experiments conducted have shown that such tangential supply makes the feeding of the material more effective, in other words the mass does not stop on the circumference of the apparatus. Feeding devices 9 and 10 and correspondingly supply conduits 6 and 7 can also be positioned in different places in the axial direction of the apparatus. Therefore, the selection of the place of supply can also be used to affect the amount of heat generated by the friction, since when material is supplied earlier in the axial direction, the amount of heat generated by the friction is greater than if material is supplied later in the axial direction.

The material flows to be supplied can also be preheated, if desired, and on the other hand, for example only one material flow can be preheated, if desired. The place where material is supplied can also be cooled, if desired, so that the temperature of the material inside the extruder can also be adjusted.

FIG. 2 is a schematic cross-section of a detail of another extruder according to the invention. The extruder comprises an inner stator 1 and an outer stator 2 and a conical intermediate stator 11 placed between them. Between the inner stator 1 and the intermediate stator 11 there is a rotatable inner rotor 3a. Correspondingly, between the intermediate stator 11 and the outer stator 2 there is a rotatable outer rotor 3b. The figure also shows screw threads provided on the inner and outer surfaces of the inner rotor 3a and the outer rotor 3b. The purpose of the screw threads is to transfer the material to be extruded towards the nozzle section of the extruder as the rotor 3a rotates. The inner groove 12 of the inner rotor 3a has a greater cross-section than the outer groove 13 of the inner rotor 3a. Therefore, the part of the wall on the side of the stator 1 in the final product obtained with the extruder is slightly thicker than the section extruded between the inner rotor 3a and the intermediate stator 11. Correspondingly, the inner grooves 14 of the outer rotor 3b have a smaller cross-section than the outer grooves 15 of the outer rotor 3b. Therefore, the outermost part of the wall of the final product is slightly thicker than the part extruded between the outer rotor 3b and the intermediate stator 11.

FIG. 3a schematically shows a part of a wall of a product prepared with the apparatus, of FIG. 2. The product may be for example a plastic pipe, a cable coating, a film or some other similar product. For the sake of clarity, both FIG. 3a and FIG. 3b show the wall in a horizontal view. Further, FIGS. 3a and 3b accentuate the ratio of the thicknesses of the different parts of the final product. With the apparatus of FIG. 2, it is thus possible to extrude a product in which the lowest part 12' and the uppermost part 15', shown in FIG. 3a, are thicker than the parts 13' and 14' situated between. The lowest part 12' is formed of a material that has been supplied between the inner rotor 3a and the inner stator 1 along grooves 12, and correspondingly the layers 13', 14' and 15' have been fed along corresponding grooves 13, 14 and 15. The positions of the inner rotor 3a and the outer rotor 3b can be easily changed. By placing the inner rotor 3a further out and the outer rotor 3b further in, it is possible to provide a product shown in FIG. 3b. In such a case, since the grooves 13 and 14 having the smallest cross-section are positioned in the extruder in such a way that the groove 13 is placed against the outer stator 2 and the groove 14 is correspondingly against the inner stator 1, the uppermost layer 13' and the lowermost layer 14' of the product shown in FIG. 3b and obtained in a corresponding manner are the thinnest, and the thickest layers 12' and 15' are situated between the layers 13' and 14'. Therefore changing the places of the rotors 3a and 3b provides one more parameter in addition to the method shown in FIG. 1 for varying the properties of the final product obtained.

The ratio of the thicknesses of the different parts of the final product can also be regulated by the amounts of the material flows to be supplied. For example, when such a large amount of material is supplied to each side of the rotor 3a of FIG. 2 that the grooves 12 and 13 are full, the ratio of the layer thicknesses has been found to be for example about 1:4 in the experiments conducted. Thereafter, if less material than normally is supplied to the side of the smaller grooves 13, for example, in other words if undersupply is used, it has been possible to provide a ratio of about 1:10 for the wall thicknesses. A similar effect has been achieved by supplying material with force feed to the side of the larger grooves 12. On the other hand, if a smaller amount of material is supplied to the side of the larger grooves 12 and a full amount of material or force-fed material is supplied to the side of the smaller grooves 13, the end result is a ratio of about 1:1 for the wall thicknesses of the product.

The above-described regulation of the ratio of the layer thicknesses is possible in an apparatus according to the invention since the different material layers are made to come together in an area that is in the vicinity of the rotor or the rotor ends before the actual beginning of the tool that makes the wall thickness of the entire product constant. In the prior art, a multilayer product is coextruded in such a manner that for example two extruders are placed one after the other. The different layers must then pass through a long channel before they come together, and therefore the variation of the wall thicknesses according to the present invention cannot be carried out since extruding a large amount of material through a long prechannel in order to make a layer thicker would create a great loss of pressure and therefore a high amount of heat generated by the friction. On the other hand, in the case shown in FIG. 2 where the exturder comprises two rotors, all four different material flows are made to come together at an intersection that is situated from the end of even the farthest rotor at a distance equalling less than 100 times the thickness of the material layer in question, in order to enable the regulation of the layer thicknesses.

FIG. 4 schematically shows the temperature TM of the mass to be supplied as a function of the speed of rotation Nr of the rotor. Curve A describes a situation where the speed Nf of the feed screw is 20 rpm. Curve B in turn describes a situation wherein the speed Nf of the feed screw is 40 rpm. The broken line shows, by way of example, a temperature 215° C. which can be achieved according to the accompanying figure by adjusting the speed of rotation Nr of the rotor, and the figure shows, by way of example, that when the speed Nf of the feed screw is 20 rpm, the aforementioned temperature is achieved with the speed of rotation Nr of 11 rpm for the rotor. Correspondingly, when the speed Nf of the feed screw is 40 rpm, the same temperature is achieved with the speed of rotation Nr of 15 rpm of the rotor.

Figure 5:
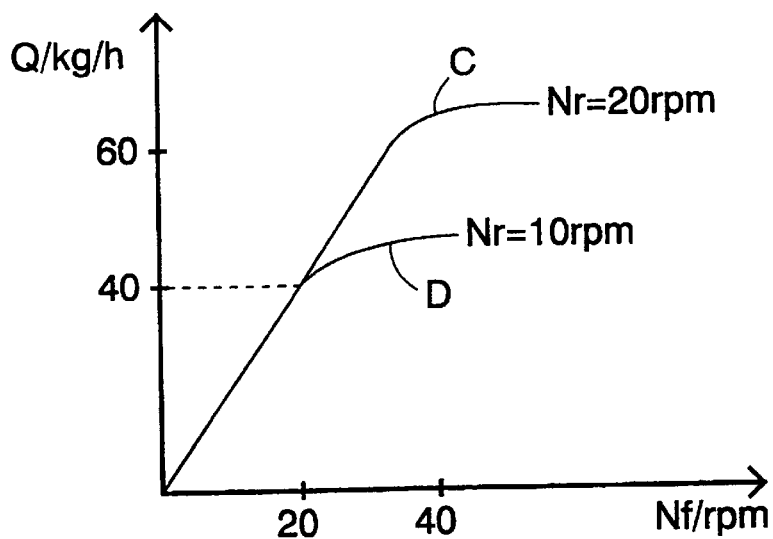
FIG. 5 shows the yield of the extruder as a function of the speed of rotation of the feed screw.

FIG. 5 shows the yield Q of the extruder as a function of the speed of rotation of the feed screw. The upper curve C describes a situation where the speed of rotation Nr of the rotor is 20 rpm. Correspondingly, the lower curve D describes a situation where the speed of rotation Nr of the rotor is 10 rpm. The yield Q can be adjusted by regulating the speed of rotation Nf of the feed screw. However, when the speed of rotation Nf of the feed screw is increased, the yield curve reaches at some stage its saturation value. This saturation occurs the sooner the smaller the speed of rotation Nr of the rotor is. The numerical values shown in FIGS. 4 and 5 are only given as examples and may thus vary in each case.

Figure 6:
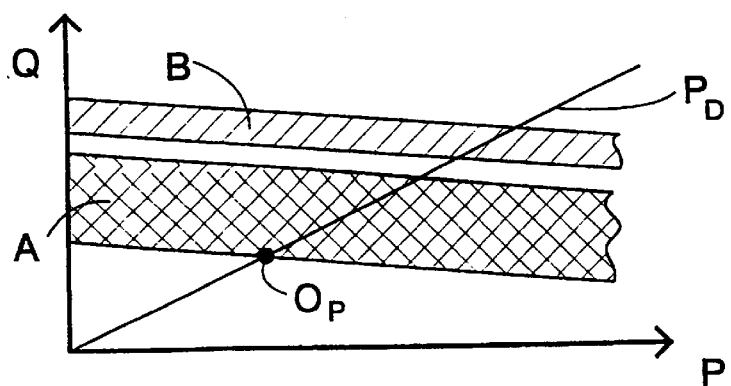
FIG. 6 shows schematically a processing window of an extruder.

FIG. 6 shows schematically a processing window of an extruder. Area A describes the yield Q of an extruder according to the invention as a function of the counterpressure of the nozzle. As the counterpressure rises, the yield typically decreases slightly. Area A also describes the area of regulation of the yield 6 of the extruder according to the invention with respect to the amount of the supply, i.e. the processing window. Area B correspondingly describes a processing window of a conventional cylindrical extruder. The point of operation $O_P$ of the process is in a place where the pressure of the nozzle $P_D$ and area A intersect. The processing window of the extruder according to the invention is therefore considerably wider than that of a conventional extruder.

The drawing and the description related thereto are only intended to illustrate the inventive idea. The details of the invention may vary within the scope of the claims. Therefore, there may be more than two rotors, whereupon the final product obtained naturally consists of several layers. In such a case, changing the places of the rotors also provides more different alternatives. Further, the grooves provided in the exterior and interior of the rotor can have identical cross-sections in some rotor, but in order to benefit from the changing of the rotor positions, the grooves should be different or placed in a different order at least in one rotor compared to the other rotor.

The outer stator 2 can also be made rotatable, if desired. Grooves 12 to 15 may also be provided in the stator instead of or in addition to the rotor. Especially when materials having a high molecular mass are processed, there are grooves preferably both in the rotor and in the stator. Especially preferably the rotor then comprises grooves that are about double compared to those of the stator. Also, material is preferably supplied to a feed gap that is at least partly reduced in volume, so that the yield of the apparatus and its adjustability can be improved.

In connection with masses having a high viscosity, it is preferable to make the gradient of the stator grooves greater than the gradient of the rotor grooves in order to decrease the residence time and therefore the temperature of the mass. Otherwise, it is preferable to make the gradient of the stator grooves smaller. In each case, if the grooves are placed along the entire length of the rotor and the stator, the grooves are of different length in the rotor and the stator provided on different sides of the same feed gap. Also in different sides of the rotor, the lengths and gradients of the screw recess of the grooves may differ from each other in different sides of the rotor.

What is claimed is:

1. An extruder comprising:
   (a) rotor means and stator means for collectively defining at least first and second conical feed gaps disposed one within the other in a radial direction of the extruder, said rotor means comprising at least one rotatable rotor, said stator means comprising at least one stator, said first and second feed gaps being disposed either (i) with the first feed gap between the at least one rotor and the at least one stator and the second feed gap between the at least one rotor and a second stator or (ii) with the first feed gap between the at least one stator and the at least one rotor and the second feed gap between the at least one stator and a second rotatable rotor;
   (b) first supply conduit means, including a first supply conduit, for feeding material to be extruded through the first supply conduit to the first feed gap, said first supply conduit means including first adjustable means for regulating flow of the material such that the material can be caused to flow through the first supply conduit to the first feed gap at any of a plurality of different rates;
   (c) second supply conduit means, including a second supply conduit, for feeding the material through the second supply conduit to the second feed gap, said second supply conduit means including second adjustable means for regulating flow of the material such that the material can be caused to flow through the second supply conduit to the second feed gap at any of a plurality of different rates; said first and second adjustable means being separately adjustable; and
   (d) means for adjusting a speed at which the at least one rotor rotates, whereby the speed at which the at least one rotor rotates and the respective rates at which the material flows through the first and second conduits are each adjustable to regulate a temperature of the material in the extruder.

2. An extruder according to claim 1, wherein the at least one rotor comprises a plurality of grooves or screw threads on opposing first and second sides thereof, the grooves or screw threads on the first side of the at least one rotor being of different length than the grooves or screw threads on the second side of the at least one rotor.

3. An extruder according to claim 1, wherein each of the first and second supply conduit means further comprises a feeding device.

4. An extruder according to claim 3, wherein the feeding device is a pump or screw.

5. An extruder according to claim 1, wherein each of the at least one rotor and the at least one stator comprises grooves near the first or second feed gap, the grooves of the at least one rotor having a gradient that is greater than a gradient of the grooves of the at least one stator.

6. An extruder according to claim 1, comprising the at least one rotor and the second rotor, each of said at least one and second rotors comprising opposing sides with each of the opposing sides comprising a set of screw-shaped grooves, at least a first set of screw-shaped grooves of the at least one rotor having a cross-section that is different than a cross-section of a first set of screw-shaped grooves of the second rotor, each of said at least one and second rotors being positionable in the extruder in any of a plurality of positions.

7. A method for extruding material comprising:
   (a) providing an extruder as claimed in claim 1; and
   (b) feeding a first portion of the material into the first feed gap through the first supply conduit at a first rate and a second portion of the material into the second feed gap through a second supply conduit at a second rate that is different from the first rate.

8. A method for extruding material comprising:
   (a) providing an extruder as claimed in claim 1; and
   (b) feeding a first portion of the material into the first feed gap through the first supply conduit at a first rate and a second portion of the material into the second feed gap through a second supply conduit; and
   (c) adjusting the temperature of the material in the first or second portions by separately regulating the rate at which the material flows through the first and second conduits and by regulating a speed at which the at least one rotor rotates.

9. A method for extruding material comprising:
   (a) providing an extruder as claimed in claim 1; and
   (b) feeding a first portion of the material into the first feed gap through the first supply conduit at a first rate and a second portion of the material into the second feed gap through a second supply conduit; and
   (c) maintaining constant the rate at which each of the first and second portions of material flows through the respective first and second conduits, and
   (d) adjusting the temperature of the material in the first or second portions by regulating the speed at which the at least one rotor rotates.

10. A method for extruding material comprising:
    (a) providing an extruder as claimed in claim 6;
    (b) feeding a first portion of the material into the first feed gap through the first supply conduit at a first rate and a second portion of the material into the second feed gap through a second supply conduit at a second rate that is different than the first rate and causing the first and second portions to be extruded to produce a first extruded product.

11. A method according to claim 10 further comprising changing the respective positions of the at least one and second rotors to produce a second extruded product with properties that are different than properties of the first extruded product.

12. A method for extruding material to form an extruded product comprising:
    (a) providing an extruder comprising at least one rotatable rotor disposed between a plurality of stators or at least one stator disposed between the at least one rotor and a second rotor, said rotor and stators or stator and rotors defining at least first and second conical feed gaps disposed one within the other in a radial direction,
    (b) feeding a first portion of the material into the first feed gap through a first supply conduit and a second portion of the material into the second feed gap through a second supply conduit; and
    (c) adjusting the temperature of the material in the first or second portions by separately regulating a rate at which the material flows through the respective first and second conduits and by regulating a speed at which the at least one rotor rotates.

13. A method according to claim 12, comprising maintaining constant the rate at which each of the first and second portions of material flows through the respective first and second conduits and adjusting the temperature of the material in the first or second portions by regulating the speed at which the at least one rotor rotates.

14. A method according to claim 12, comprising cooling the material in the first or second portion of material as it is fed to the first or second feed gap.

15. A method for making a coextruded product with at least first and second material layers, said method comprising:
   (a) providing an extruder comprising at least one rotatable rotor disposed between a plurality of stators or at least one stator disposed between the at least one rotor and a second rotor, said rotor and stators or stator and rotors defining at least first and second conical feed gaps disposed one within the other in a radial direction; said extruder further comprising a tool for making a wall thickness of the coextruded product constant, said at least one rotor, first and second feed gaps and tool being disposed in the extruder such that a first material that has passed through the first feed gap comes together with a second material that has passed through the second feed gap before contacting the tool; and
   (b) feeding the first material to the first feed gap and the second material to the second feed gap to cause said first and second materials to be coextruded in the extruder to form said coextruded product.

16. A method according to claim 15, wherein the first material layer comprises a first thickness and the second material layer comprises a second thickness, said method comprising adjusting a ratio of the first thickness to the second thickness by regulating respective rates at which the first and second materials are fed into the respective first and second feed gaps.

17. A method according to claim 15, wherein the extruder comprises said second rotor in addition to the at least one rotor, said rotors and first and second feed gaps being disposed in the extruder such that the first and second materials come together at a point that, as measured from a tip of each of the rotors, is less than 100 times a thickness of the first or second material layer.

* * * * *